Nov. 1, 1927.  
G. ADSIT ET AL  
1,647,681  
WINDING MACHINE  
Filed Jan. 28, 1925  
2 Sheets-Sheet 1
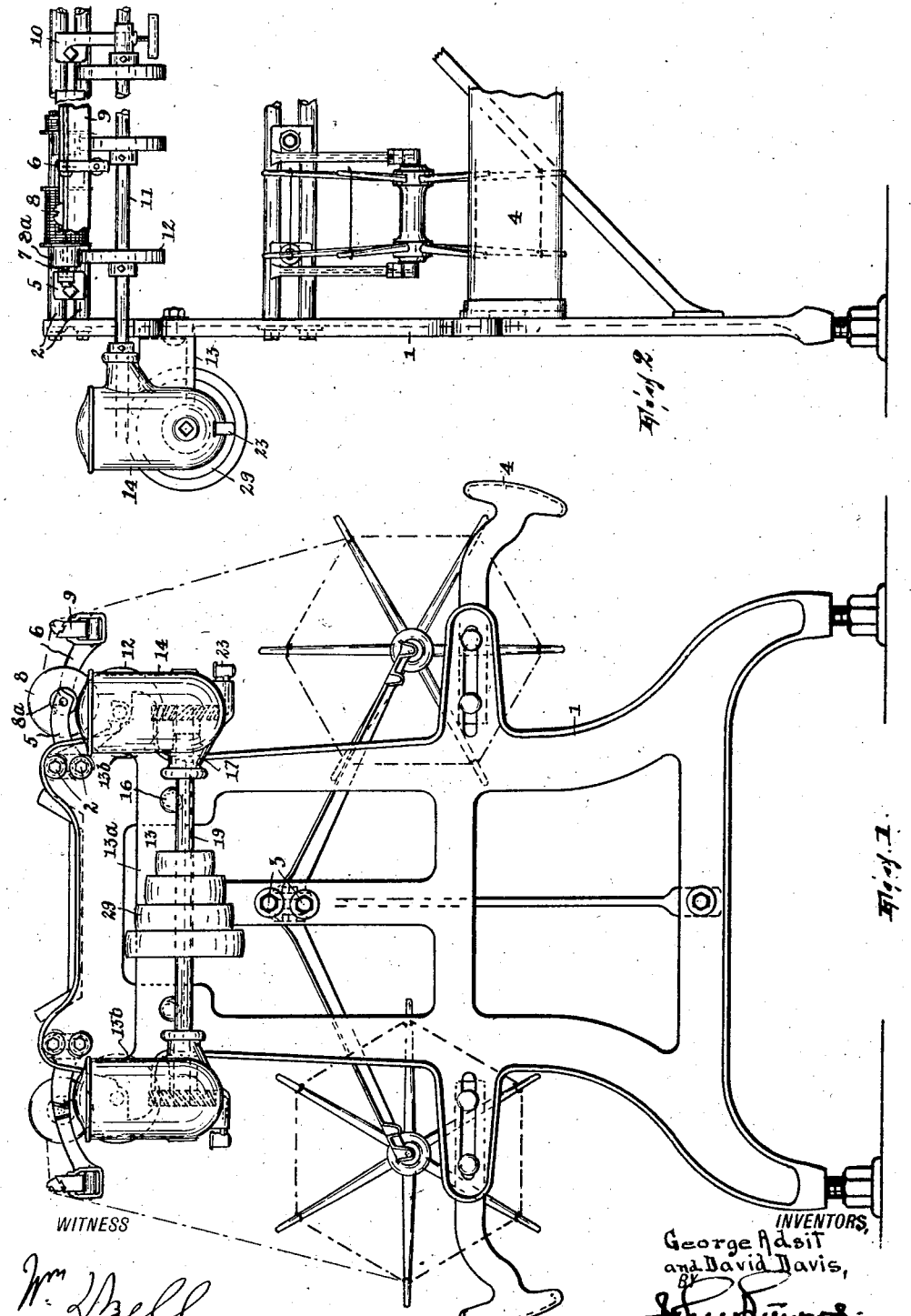
INVENTORS  
George Adsit  
and David Davis,

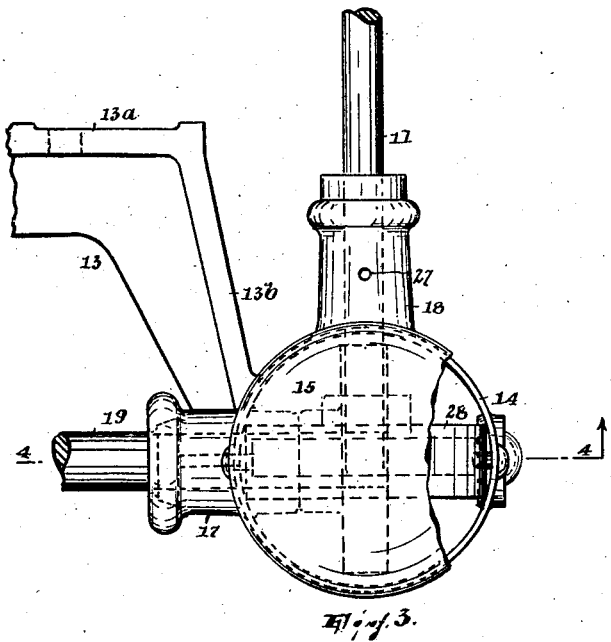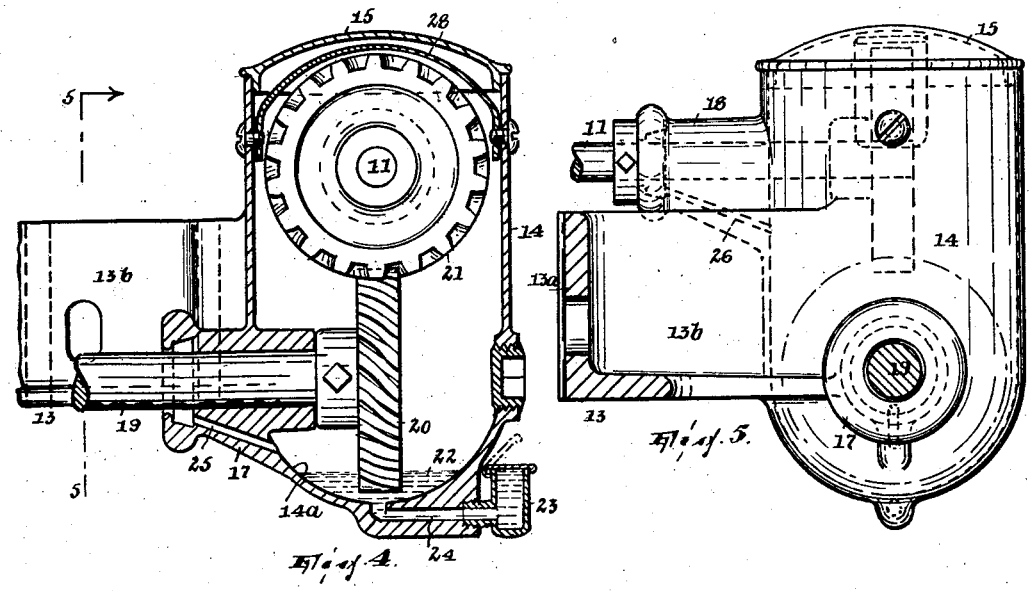

Patented Nov. 1, 1927.

1,647,681

UNITED STATES PATENT OFFICE.

GEORGE ADSIT AND DAVID DAVIS, OF PATERSON, NEW JERSEY, ASSIGNORS TO BENJAMIN EASTWOOD COMPANY, OF PATERSON, NEW JERSEY.

WINDING MACHINE.

Application filed January 28, 1925. Serial No. 5,198.

This invention relates to winding machines of the type in which the rotary members on which the yarn is wound are arranged along the side of the machine with their axes alined horizontally and are driven from a horizontal longitudinal shaft by peripheral contact with driving wheels thereon, said shaft being rotated through gearing from a horizontal cross-shaft outward of one end of the machine; usually there is a set of the rotary members and a longitudinal shaft at each side of the machine, with one cross-shaft for both. In these machines it is usual to mount the longitudinal shaft or shafts and cross-shaft in bearings entirely independent of each other. In consequence unless the shafts are set with relation to each other with the greatest care and remain when so set exactly as so related the gears do not mesh properly, so that there is a whining and "chattering" thereof and the gears wear and have to be renewed frequently. In addition, the longitudinal and cross-shafts are arranged in the same horizontal plane, necessitating the use of gears (as bevel gears) which by their very nature and this relation of the shafts to each other produce a "chattering". And this separate or independent supporting of the shafts does not lend itself to proper lubrication without the lubricant being thrown off onto other parts of or near the machine.

According to this invention we provide a housing bearing for the near ends of the cross-shaft and a longitudinal shaft which is unitary and we arrange the two shafts so that each has a bearing in such unitary housing bearing, which is hollow inside, their two axes crossing each other within the chamber or space of the housing bearing and they being connected by spiral gearing. Therefore our construction results in these advantages, to wit: The setting of the shafts with reference to each other being definitely fixed and maintained by the unitary housing bearing they must of necessity stand and remain in perfectly correct relation for proper coaction of their gears, all other bearing means, such as the series of bearing brackets which support the longitudinal shaft, being fitted to the machine with reference to the two shafts after their assembly with the housing bearing has been accomplished. The chamber of the housing bearing affords a lubricant receptacle which entirely encloses the two gears and so prevents all throwing-about of lubricant, and because the axes of the shafts cross each other one above the other this housing bearing may take a form which makes it a symmetrical and otherwise appropriate corner fitting for the machine. When, as usual, there are two longitudinal shafts we preferably form the two housing bearings, one for each juncture of such a shaft with the cross-shaft, in a single structure, whereby error in alining the two bearings for the cross-shaft is avoided and they remain permanently alined and the assembly of the entire system of shafts and bearings is greatly simplified.

In the drawings,

Fig. 1 is an elevation of the driving end of the machine;

Fig. 2 is a side elevation of the same end; and

Figs. 3, 4 and 5 are a plan view, appearing partly broken away, a vertical transverse sectional view on the line 4—4 in Fig. 3, and a sectional view lengthwise of the machine on the line 5—5 in Fig. 4 of the structure embodying the two housing bearings for the longitudinal shafts and cross-shaft.

The frame of the machine may include, as usual, two or more uprights 1 (only one of which is shown), pairs of rods or their equivalents connecting these uprights, two pairs 2 at the top and both sides of the frame and the other pair 3 lower down and arranged centrally of the machine, and knee-rails 4 suitably secured to the uprights 1 at both sides of the frame. The pairs of rails 2 afford support for bearing brackets 5 and 6 which are provided with suitable sockets in the usual way to receive the ends of the spindles 7 on which are placed the receiving spools or bobbins 8, and the brackets 6 may also afford as usual a guide for the traverse rail 9 which is reciprocated lengthwise of itself and parallel with the rails 2. The rails 2 may also carry, as usual, the bearing brackets 10, (only one of which is shown) in which are journaled the two longitudinal rotary shafts 11 already mentioned, these shafts having fixed thereon driving wheels 12 to rotate the bobbins 8 the whirls $8^a$ of whose spindles rest on the periphery of said wheels.

Describing the invention with reference to the specific form shown, and having reference first to the structure including the two housing bearings, a casting is formed as follows: The body part 13 of this casting has a straight central portion 13$^a$ and two arms 13$^b$ projecting therefrom at approximately 90°, the central portion and the two arms being L-shaped in cross-section. At the end of each arm the casting has as an integral portion thereof a cup-shaped part 14 which is preferably a cylinder elongated vertically and in the best form having a hemi-spherical bottom 14$^a$; it is best that the cup or part 14, which as will appear is the housing bearing, should have a removable top or cover, and for this purpose 15 is a cap which rests on the cup and has an interior flange as shown in Fig. 4 to fit into the same. The two cups 14 of the casting are of similar dimensions and are symmetrically related to the body part 13$^a$ of the casting, so that when the latter is bolted or otherwise secured in horizontal position to the uprights 1 by any suitable means, as the bolts 16 in Fig. 1, the two cups will stand at the same level. Each cup or housing bearing has at the side adjoining the other an integral bearing 17 whose axis is horizontal and parallel with the body part 13$^a$ of the casting and is preferably nearer the bottom of the cup. Above this bearing each cup has another bearing 18 whose axis is arranged at right angles to the bearing 17 and which is at the side of the cup adjoining the opposite end of the machine. Each bearing 17 and 18 is in a plane coincident with the vertical axis of the (cylindrical) cup. The bearings 17 of the two cups 14 afford journals for the cross-shafts 19; the bearings 18 afford journals for the ends of the longitudinal shafts 11 which adjoin the cross-shaft. Each end of the cross-shaft carries within the housing bearing a spiral gear 20, and the end of each longitudinal shaft 11 which is within a housing bearing carries a spiral gear 21 in mesh with the gear 20. The gears 20 and 21 in each bearing are fixed on the shafts 19 and 11, and the central plane of the toothed-portion of each gear is coincident with the vertical plane in which lies the axis of the shaft on which the other gear is mounted. The housing bearing is adapted to receive liquid lubricant indicated at 22 in Fig. 4, which may be introduced thereto to limit the quantity to be contained in the housing bearing by fitting the latter with a filling cup 23 arranged at the bottom portion of the housing bearing and connected with the interior of the latter by a duct 24 leading to its interior at the bottom. The gear 20 dips into the lubricant 22 so that thereby the teeth of the two gears become lubricated. The lubricant finds its way to the shafts and by capillary attraction the bearings 17 and 18 are lubricated, the outward movement of the oil being stopped by the annular channels shown and finding its way back to the cups by the ducts 25 and 26. Thus the bearings are lubricated under all conditions except when the machine is operated for the first time or after a long idle period, when it may be necessary to prime with lubricant the upper bearing 18 at the oil hole 27 (Fig. 3) leading to its bore. Since the gears 21 rotate at considerable speed, to prevent the oil thrown off thereby against the inside of the cups 14 from working up between the same and their covers (when detachable) an arched oil-guard 28 may be secured to the inside of each cup under the gear 21.

The cross-shaft may be driven in any way, as by the stepped-pulley shown thereon in Figs. 1 and 2 at 29 to receive a driving belt.

Having thus fully described our invention, what we claim and desire to secure by Letters Patent is:

1. In a winding machine, the combination of a supporting structure, rotary winding members journaled therein with their axes horizontally alined, a rotary driven shaft arranged in said structure outwardly thereof and parallel with the axes of said members and having wheels on which said members bear, a driving cross-shaft arranged horizontally at one end of and outwardly of said structure and at right-angles to the first-named shaft and crossing the same, a hollow housing bearing projecting from said structure and affording bearings one above the other for the adjoining ends of the shafts, and gearing within the housing bearing and including gear members fixed on the crossing portions of the two shafts.

2. In a winding machine, the combination of a supporting structure, rotary winding members journaled therein with their axes horizontally alined, a rotary driven shaft arranged in said structure outwardly thereof and parallel with the axes of said members and having wheels on which said members bear, a driving cross-shaft arranged horizontally at one end of and outwardly of said structure and at right-angles to the first-named shaft and crossing the same, a housing bearing projecting from said structure and affording bearings one above the other for the adjoining ends of the shafts and having an interior lubricant chamber receiving both of said ends, and gearing within said chamber and including gear members fixed on the crossing portions of the two shafts.

3. In a winding machine, the combination of a supporting structure, rotary winding members journaled therein with their axes horizontally alined, a rotary driven shaft arranged in said structure outwardly thereof and parallel with the axes of said members and having wheels on which said members bear, a driving cross-shaft arranged horizontally at one end of an outwardly of said structure and at right-angles to the first-named shaft and crossing the same, an upright cylindrical housing bearing secured to said structure with its vertical axis in vertical planes coincident with the axes of both shafts and affording bearings one above the other for the adjoining ends of the shafts, and spiral gears within the housing bearing fixed on the crossing portions of said shafts and meshing with each other.

4. In a winding machine, the combination of a supporting structure, rotary winding members journaled therein in two sets one at each side of said structure, the members in each set having their axes alined and parallel with those of the other and horizontal, rotary driven shafts arranged in said structure one at each side and outwardly thereof and parallel with said axes, said shafts having wheels on which the members of said sets respectively bear, a driving cross-shaft arranged horizontally at one end of and outwardly of said structure and at right-angles to the first-named shafts and crossing the same, an elongated bearing structure secured to said end of the supporting structure horizontally and having housing bearings projecting from both ends thereof and each affording bearings one above the other for one end of the cross-shaft and the corresponding end of one of the first-named shafts, and gearing within each housing bearing and including gear members fixed on the crossing portions of the corresponding two shafts.

In testimony whereof we affix our signatures.

GEORGE ADSIT.
DAVID DAVIS.